United States Patent
Kano et al.

[11] Patent Number: 6,028,332
[45] Date of Patent: Feb. 22, 2000

[54] SEMICONDUCTOR TYPE YAW RATE SENSOR

[75] Inventors: Kazuhiko Kano, Toyoake; Makiko Fujita, Nisshin; Yoshinori Ohtsuka, Okazaki, all of Japan

[73] Assignee: Denso Corporation, Kariya, Japan

[21] Appl. No.: 09/106,018

[22] Filed: Jun. 29, 1998

[30] Foreign Application Priority Data

Jun. 30, 1997 [JP] Japan .................................. 9-174869

[51] Int. Cl.⁷ .................................................. H01L 29/82
[52] U.S. Cl. .......................... 257/254; 257/415; 257/417; 257/420; 73/514.01; 73/514.02; 73/514.21; 73/514.29; 73/514.36; 73/DIG. 1
[58] Field of Search ................... 257/417, 420, 257/415, 254; 73/DIG. 1, 514.02, 514.21, 514.36, 514.29, 514.01

[56] References Cited

U.S. PATENT DOCUMENTS

| | | | |
|---|---|---|---|
| 5,233,213 | 8/1993 | Marek | 257/415 |
| 5,313,835 | 5/1994 | Dunn | 73/505 |
| 5,329,815 | 7/1994 | Dunn et al. | 73/505 |
| 5,461,916 | 10/1995 | Fujii et al. | 73/514.32 |
| 5,500,549 | 3/1996 | Takeuchi et al. | 257/425 |
| 5,504,756 | 4/1996 | Kim et al. | 371/22.3 |
| 5,541,437 | 7/1996 | Watanabe et al. | 257/417 |
| 5,572,057 | 11/1996 | Yamamoto et al. | 257/417 |
| 5,587,343 | 12/1996 | Kano et al. | 437/228 |
| 5,619,050 | 4/1997 | Uenoyama et al. | 257/254 |
| 5,622,633 | 4/1997 | Ohtsuka et al. | 438/53 |
| 5,627,397 | 5/1997 | Kano et al. | 257/417 |
| 5,756,901 | 5/1998 | Kurle et al. | 73/777 |

FOREIGN PATENT DOCUMENTS

| | | |
|---|---|---|
| 2-223817 | 9/1990 | Japan . |
| 4-142420 | 5/1992 | Japan . |
| 6-66569 | 3/1994 | Japan . |
| 6-123628 | 5/1994 | Japan . |
| 6-288773 | 10/1994 | Japan . |
| 7-159181 | 6/1995 | Japan . |

*Primary Examiner*—William Mintel
*Attorney, Agent, or Firm*—Pillsbury Madison & Sutro LLP

[57] ABSTRACT

A semiconductor type yaw rate sensor has a substrate, a beam structure formed from a semiconductor material and having at least one anchor portion disposed on the substrate, a weighted portion located above the substrate a predetermined gap therefrom, and a beam portion which extends from the anchor portion and supports the weighted portion. A movable electrode is formed onto the weighted portion, and a fixed electrode is formed on the substrate in such a manner that the fixed electrode faces the movable electrode. When a drive voltage is applied between the movable electrode and the fixed electrode, the beam structure is forcibly caused to vibrate in a direction that is horizontal relative to a substrate surface plane. In this yaw rate sensor, a strain gauge to monitor forced vibration of the beam structure is formed in the beam portion. As a result, the forced vibration of the beam structure can be monitored with a simple structure.

12 Claims, 11 Drawing Sheets

SEMICONDUCTOR TYPE YAW RATE SENSOR

CROSS REFERENCE TO RELATED APPLICATION

This application is based upon and claims priority from Japanese Patent Applications No. Hei.9-174869 filed Jun. 30, 1997.

BACKGROUND OF THE INVENTION

1. Field of the Invention

The present invention relates to a semiconductor type yaw rate sensor having a beam structure formed from a semiconductor material.

2. Related Art

A conventional semiconductor type yaw rate sensor is disclosed in JP-A-H.8-148698. In this semiconductor type yaw rate sensor, a beam structure is formed from a semiconductor material and is located a predetermined distance above an upper surface of a substrate. The beam structure is forcibly caused to vibrate in a horizontal direction relative to the substrate surface plane. A yaw rate is detected based on vertical displacement of the beam structure relative to the substrate surface plane.

In this semicondutor type yaw rate sensor, to detect vibrating state of the beam structure in the horizontal direction, a movable gate electrode is provided in the beam structure, and source and drain electrodes are formed in the substrate. Due to this arrangement, the vibrating state of the beam structure in the horizontal direction, that is, forced vibration of the beam structure, is detected as a drain current flowing between the source and drain electrodes. The beam structure is caused to vibrate at a constant resonant frequency based on the detected drain current.

In the above-mentioned conventional yaw rate sensor, however, it is necesary not only to provide the movable gate electrode in the beam structure but also to form the source and drain electrodes in the substrate. Therefore, the structure of the yaw rate sensor becomes complicated.

SUMMARY OF THE INVENTION

The present invention is made in view of the above problem, and its object is to provide a semiconductor type yaw rate sensor in which forced vibration of a beam structure can be monitored with a simple structure.

The semiconductor type yaw rate sensor according to the present invention has a substrate, a beam structure formed from a semiconductor material and having at least one anchor portion disposed on the substrate, a weighted portion located above the substrate with a predetermined gap therefrom, and a beam portion which extends from the anchor portion and supports the weighted portion. A movable electrode is formed onto the weighted portion, and a fixed electrode is formed on the substrate in such a manner that the fixed electrode faces the movable electrode. When a drive voltage is applied between the movable electrode and the fixed electrode, the beam structure is forcibly caused to vibrate in a horizontal direction relative to a substrate surface plane. In this yaw rate sensor, a strain gauge is formed in the beam portion to monitor forced vibration of the beam structure. As a result, the forced vibration of the beam structure can be monitored with a simple structure.

In this case, it is preferable to provide a circuit which generates the drive voltage to be applied between the movable electrode and the fixed electrode such that a resonance frequency in vibration of the beam structure is maintained at a constant value. The drive voltage can be produced from the output of the strain gauge.

A diffusion layer may be formed in the beam portion. The diffusion layer can be utilized as a wire leading to the strain gauge. Alternatively, a metal wire may be provided on the beam portion to be used as the wire leading to the strain gauge. Due to the wire, the strain gauge can be electrically connected to an electrode formed at, for example, the anchor portion.

The wire may be formed in a U-shaped configuration in the beam portion, and both ends of the wire are connected to a pair of electrodes formed in the anchor portion. Alternatively, when at least two anchor portions are disposed on the substrate, the wire may be provided in such a manner that one end of the wire is connected to a first electrode formed in one of the anchor portions, and the other end of the wire is connected to a second electrode formed in the other of the anchor portions. That is, the wire travels through the beam portion extending from one of the anchor portions, the weighted portion, and the beam portion extending from the other of the anchor portions. In this case, even if a width of the beam portion is small, wiring can be easily carried out.

Preferably, two strain gauges are formed in different positions so that, while the beam structure is caused to vibrate in the horizontal direction, when a tensile stress is applied to one of the strain gauges a compressive stress is applied to the other of the strain gauges. In this case, the resistances of the two strain gauges reverse relative to one another. Therefore, when a half-bridge circuit or a full-bridge circuit is constructed using the two strain gauges, it is possible to accurately monitor the forced vibration of the beam structure.

Further, the strain gauge is preferably formed to be offset from a neutral axis of the beam portion during the forced vibration of the beam structure. If the strain gauge is located along the neutral axis, an extremely small tensile or compressive stress is applied thereto. Therefore, with the strain gauge offset from the neutral axis, the forced vibration of the beam structure can be accurately detected.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

PREFERRED EMBODIMENTS OF THE INVENTION (First Embodiment)

Figure 1:
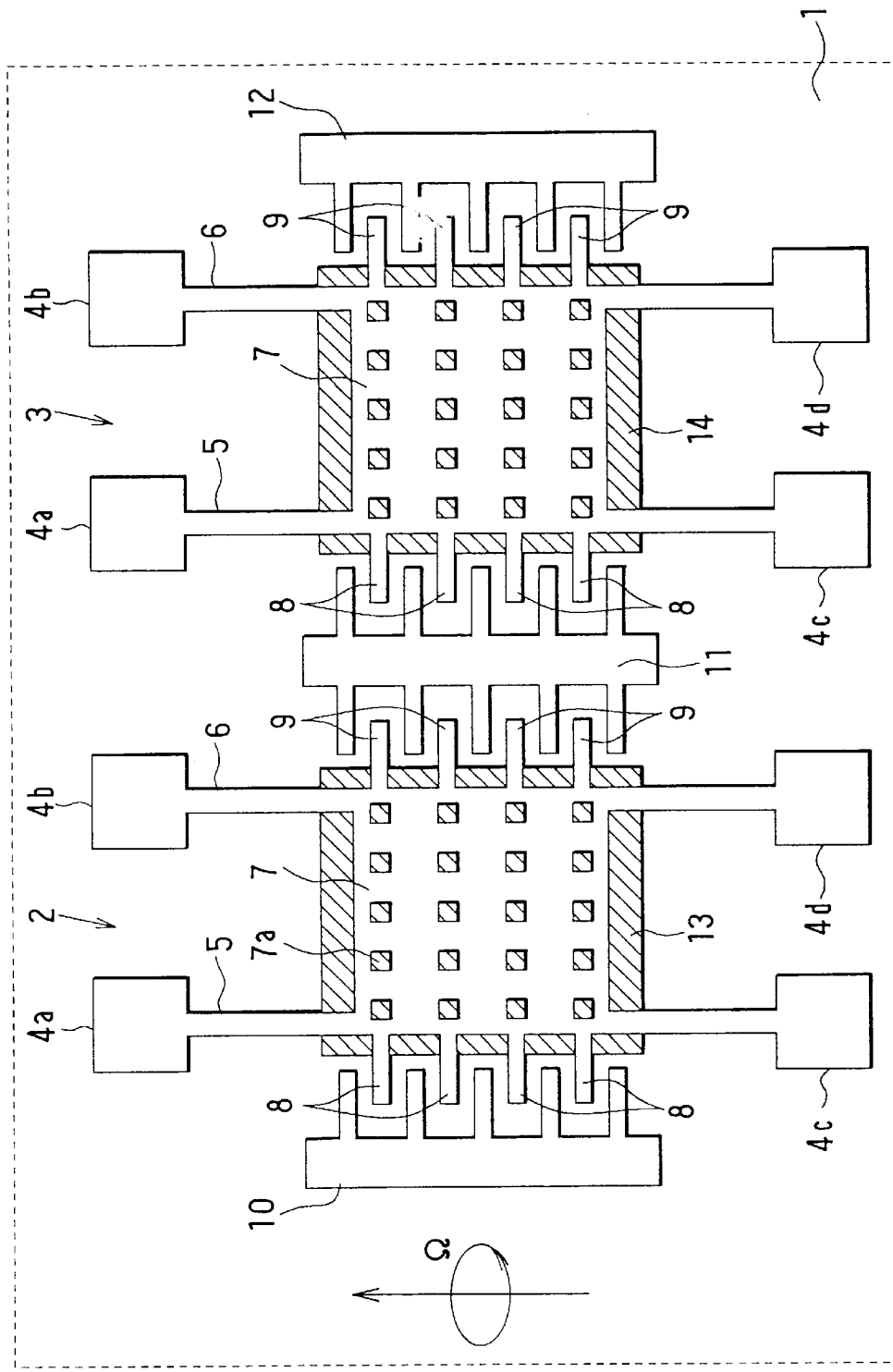
FIG. 1 is a plan view of a semiconductor type yaw rate sensor according to a first embodiment of the present invention.

As shown in FIG. 1, a semiconductor type yaw rate sensor has beam structures (movable structures) 2, 3 on an upper surface of a semiconductor substrate 1. The beam structures 2, 3 are caused to vibrate in opposite phase, and an output signal from each of the beam structures 2, 3 is generated. A yaw rate is detected due to differential detection of the output signals from the beam structures 2, 3.

The beam structure 2 includes four anchor portions 4a, 4b, 4c and 4d disposed on the substrate 1 with predetermined gaps therebetween. A beam portion 5 is installed between the anchor portions 4a, 4c and a beam portion 6 is installed between the anchor portions 4b, 4d. A weighted portion (mass portion) 7a is provided between the beam portions 5, 6. Therefore, the beam portions 5, 6 are connected via the weighted portion 7.

In the weighted portion 7, plural holes 7a that vertically penetrate the weighted portion 7 are formed. Also, plural movable electrodes 8 for vibration use project from one side face of the weighted portion 7, and plural movable electrodes 9 for vibration use project from the other side face thereof. Each of the movable electrodes 8, 9 has a shape of a rectangular pole. The movable electrodes 8 and the movable electrodes 9 are equally disposed and extend in parallel with each other, respectively.

The beam structure 3 has the same structure as the beam structure 2.

On the upper surface of the substrate 1, fixed electrodes 10, 11, 12 for vibration use are provided. Each of the fixed electrodes 10, 11, 12 is supported by an anchor portion disposed on the substrate 1. The fixed electrodes 10, 12 have projecting electrode portions formed on one side face thereof, respectively. The fixed electrode 11 has projecting electrode portions formed on each side face thereof. The beam structures 2, 3 and the fixed electrodes 10, 11, 12 are positioned on the substrate 1 so that the movable electrodes 8, 9 and the projecting electrode portions of the fixed electrodes 10, 11, 12 are interleaved with gaps therebetween.

In addition, on the upper surface of the substrate 1, lower electrodes 13, 14 are formed in areas facing (covering) the weighted portions 7 of the beam structures 2, 3.

In the semiconductor type yaw rate sensor having a structure described above, when a first drive voltage is applied between the movable electrodes 8 of the beam structure 2 and the fixed electrode 10, and a second drive voltage having an opposite phase to that of the first drive voltage is applied between the movable electrodes 9 and the fixed electrode 11, the beam structure 2 (the weighted portion 7 and beam portions 5, 6) is forcibly caused to vibrate in a horizontal (parallel) direction relative to a surface of the substrate 1 due to an electrostatic force acting between the movable electrodes 8, 9 and the fixed electrode 10, 11, respectively. In the same way, when the second drive voltage is applied between the movable electrodes 8 of the beam structure 3 and the fixed electrode 11 and the first drive voltage having an opposite phase to that of the second drive voltage is applied between the movable electrodes 9 of the beam structure 3 and the fixed electrode 12, the beam structure 3 (the weighted portion 7 and beam portions 5, 6) is forcibly caused to vibrate in a horizontal direction relative to the surface of the substrate 1 due to an electrostatic force acting between the movable electrodes 8, 9 and the fixed electrode 11, 12, respectively.

At this time, when a yaw $\Omega$ acts around an axis running along the surface of the substrate 1 as shown in FIG. 1, Corioli's force is generated in a direction perpendicular to the surface of the substrate 1 and is mainly impressed on the weighted portions 7 of the beam structures 2, 3. Here, the Corioli's force Fc depends on a weight M of the weighted portion 7, a vibration rate V and the yaw $\Omega$ and is expressed by the following equation 1.

$$Fc = 2M\Omega \qquad (1)$$

During forced vibration of the beam structures 2, 3, when the weighted portions 7 of the beam structures 2, 3 are displaced in the vertical direction to the surface of the substrate 1, capacitances of capacitors formed between the beam structures 2, 3 and the lower electrodes 13, 14 change in accordance with the respective displacements of the weighted portions 7 of the beam structures 2, 3. That is, a yaw rate is detected as capacitance changes of the capacitors caused by the respective displacements of the weighted portions 7.

Also, because the vibration of the beam structure 2 is shifted by 180° in phase from the vibration of the beam structure 3, the weighted portion 7 of the beam structure 2 and the weighted portion 7 of the beam structure 3 are reversely displaced relative to one another. Therefore, with a differential detection of the output signals from the beam structures 2, 3, the yaw rate can be accurately detected.

Figure 2:
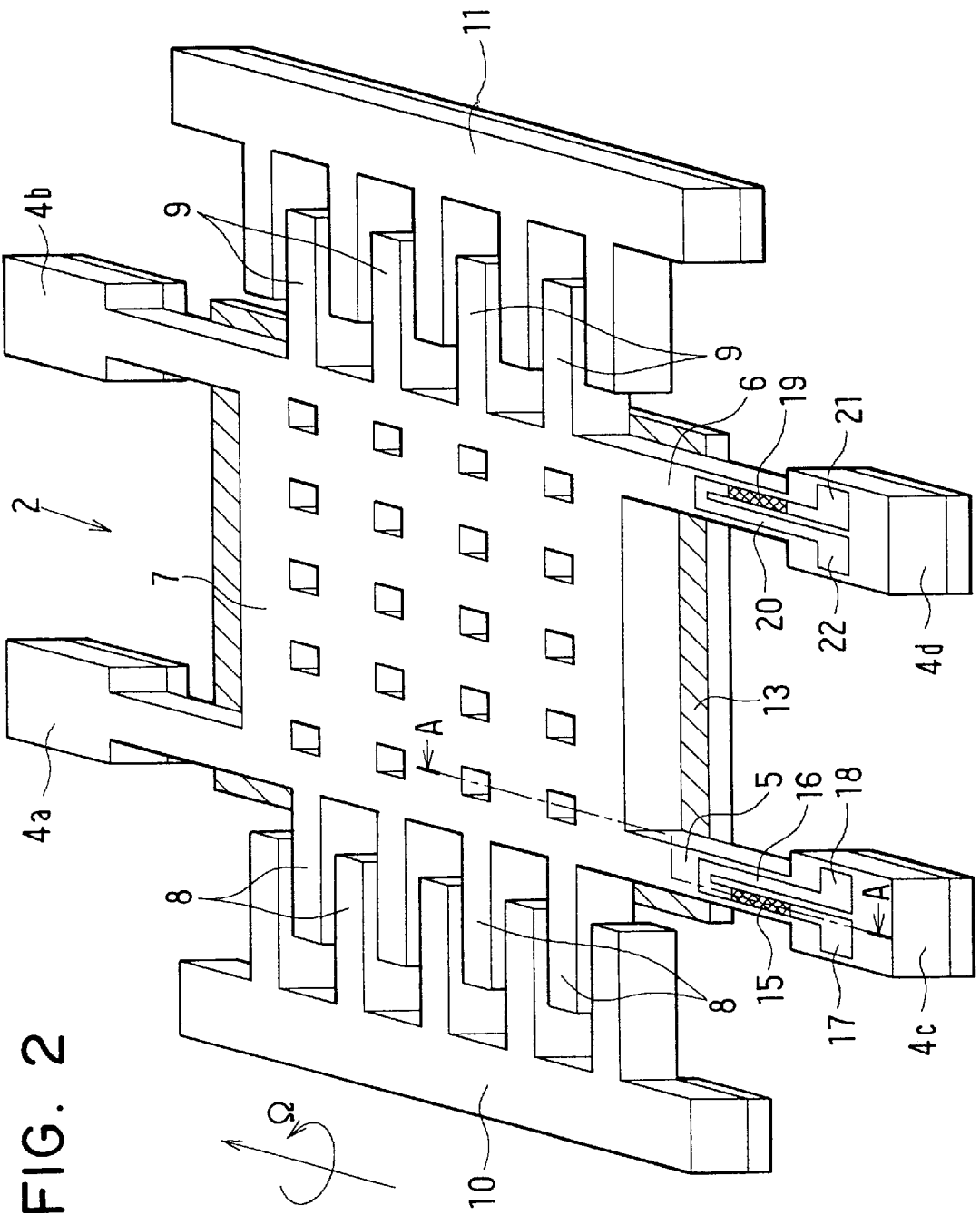
FIG. 2 is a perspective view showing a beam structure 2 and fixed electrodes 10, 11 shown in FIG. 1.

FIG. 2 is a perspective view of a left-half part of the yaw rate sensor, i.e. the beam structure 2. Although not shown in FIG. 1, strain gauges 15, 19 are formed by diffusion layers in the beam portions 5, 6 as shown in FIG. 2, in order to monitor the forced vibration of the beam structure 2.

The strain gauge 15 is connected to a pair of electrodes 17, 18 formed in the anchor portion 4c via a wiring layer 16 formed by a diffusion layer. The strain gauge 19 is connected to a pair of electrodes 21, 22 formed in the anchor portion 4d via a wiring layer 20 formed by a diffusion layer.

As shown in FIG. 2, because the strain gauge 15 is formed on a left side of a center line (neutral axis) of the beam portion 5 and the strain gauge 19 is formed on a right side of a center line of the beam portion 6, while the beam structure 2 is caused to vibrate in the horizontal direction, when one of the strain gauges 15, 19 is applied with a tensile stress, the other thereof is applied with a compressive stress. Therefore, resistances of the two strain gauges 15, 19 change reverse manner relative to each other.

Figure 3:
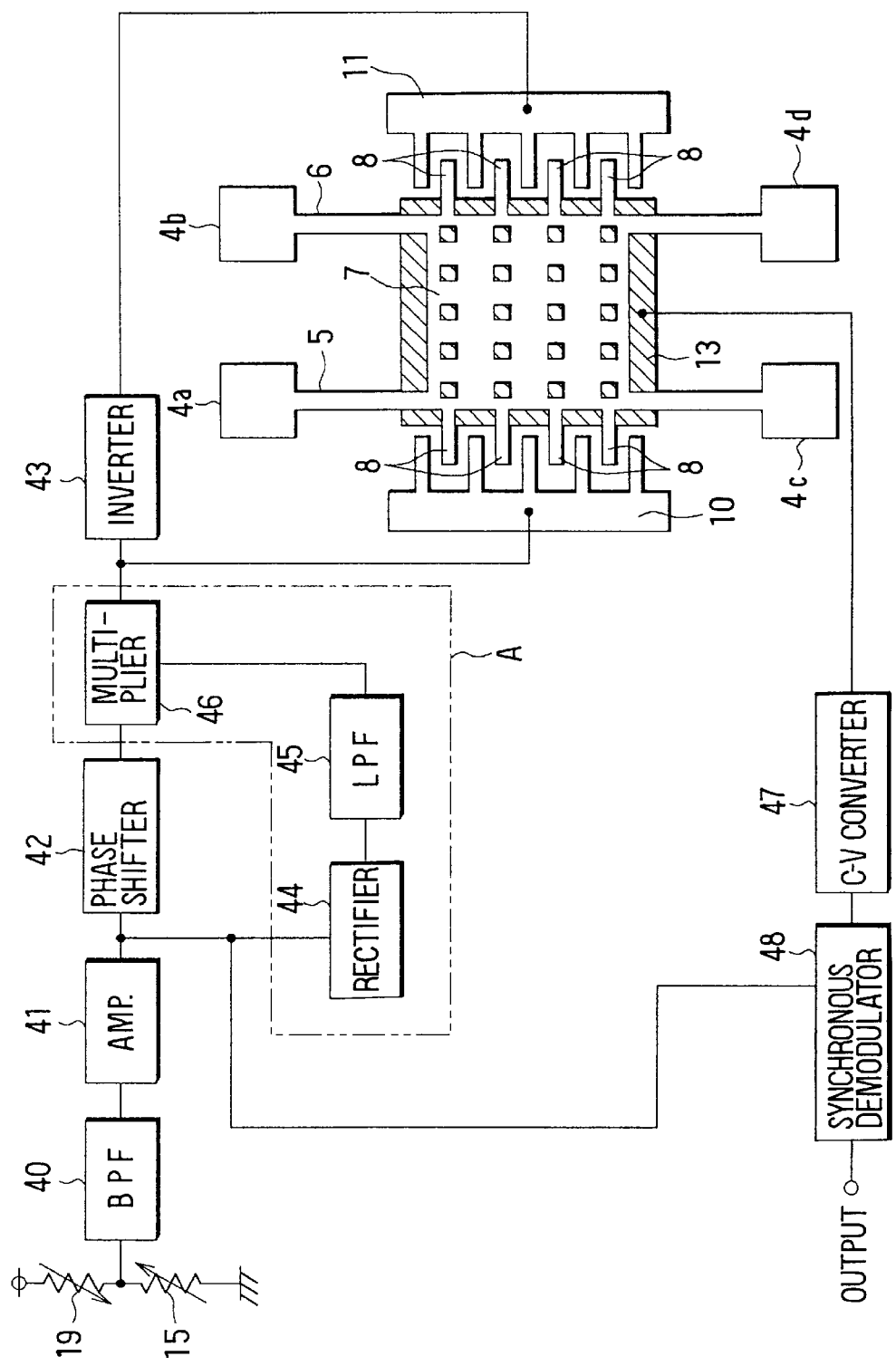
FIG. 3 is a block diagram showing a circuit for activating the beam structure and generating an output signal corresponding to a yaw rate.

FIG. 3 shows a circuit for causing the beam structure 2 to vibrate and for generating an output signal of the beam structure 2.

The strain gauges 15, 19 are connected in series to form a half bridge circuit. As a result, the respective resistance changes of the strain gauges 15, 19 are generated as a voltage change from the half bridge circuit. The voltage signal generated from the half bridge circuit is converted into a monitor signal after passing through a band pass filter (BPF) 40 and an amplifier 41. Here, during the forced vibration of the beam structure 2, the monitor signal is shifted by 90° in phase from the drive voltage to forcibly vibrate the beam structure 2. Therefore, the phase of the monitor signal is shifted by 90° by a phase shifter 42, and then the monitor signal is applied to the fixed electrode 10 as a drive voltage. Also, a signal of which the phase is inverted by an inverter 43 from the phase of the monitor signal applied to the fixed electrode 10 is applied to the fixed electrode 11. It is to be noted that the potential of the movable electrodes 8, 9 provided to the weighted portion 7 is fixed to a reference potential (for example, a ground potential).

In this way, a free-running oscillator is formed through a closed loop in which the drive voltage for the forced vibration of the beam structure 2 is generated based on the output voltage of the half bridge circuit constructed from the strain gauges 15, 19, and the strain gauges 15, 19 monitor the forced vibration of the beam structure 2 when the drive voltages are applied between the movable electrodes 8, 9 and the fixed electrodes 10, 11, respectively. The beam structure 2 is forcibly caused to vibrate at a resonant frequency by the free-running oscillator.

After the monitor signal passes through the phase shifter 42, it is multiplied by a signal generated by an automatic gain controller (AGC) A constructed by a rectifier 44, a low pass filter (LPF) 45, and a multiplier 46. As a result, it is possible to make an amplitude of the monitor signal constant, and thereby to make the amplitude of the forced vibration of the beam structure 2 constant.

The capacitance of the capacitor formed between the beam structure 2 and the lower electrode 13 is converted into a voltage signal by a C-V converter 47. The converted voltage signal is synchronously demodulated using the monitor signal generated from the amplifier 41 by a synchronous demodulator 48. Through this signal processing, a yaw rate signal is generated from the synchronous demodulator 48.

Strain gauges are also formed on the respective beam portions 5, 6 of the beam structure 3. In the same way as described above, the forced vibration of the beam structure 3 is monitored by the strain gauges. Also, based on the voltage signal generated by the strain gauges, the beam structure 3 is forcibly caused to vibrate. A yaw rate signal is also detected from the beam structure 3.

Next, a manufacturing method of the yaw rate sensor is described with reference to FIGS. 4 through 13 which are cross sectional views taken along a line A—A in FIG. 2.

Figure 4:
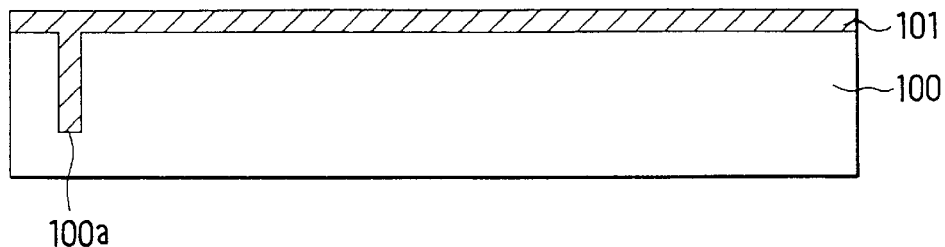
FIGS. 4 through 13 are cross-sectional views that illustrate the manufacturing process of the semiconductor type yaw rate sensor in a stepwise manner.

First, as shown in FIG. 4, an N-type monocrystalline silicon substrate (first semiconductor substrate) 100 is prepared. A trench 100a for alignment use is formed in the silicon substrate 100 by trench etching. After that, a silicon oxide film 101 serving as a sacrificial thin layer is formed by a method such as a chemical vapor deposition (CVD) process.

Figure 5:
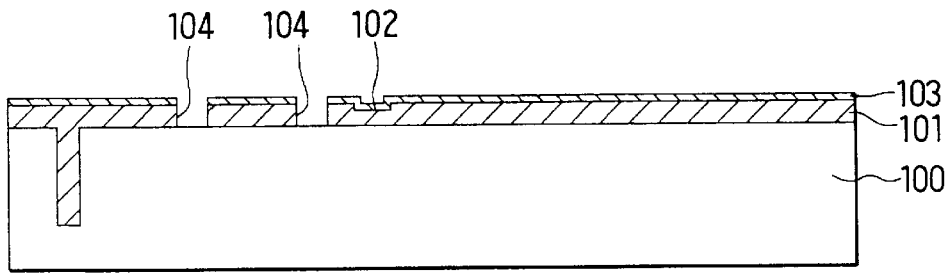

Next, as shown in FIG. 5, a concavity 102 is formed by partially etching the silicon oxide film 101. The concavity 102 is for forming a projection to reduce a contacting area of the beam structure 2 and the substrate 1 when the beam structure 2 adheres to the substrate 1 due to surface tension thereof in a sacrificial layer etching step described later. Further, a silicon nitride film (first insulating thin film) 103 that becomes an etching stopper in the sacrificial layer etching step is formed on the silicon oxide film 101.

Openings 104 are formed in a laminated body of the silicon nitride film 103 and the silicon oxide film 101 at regions where the anchor portions are to be formed by photolithography and dry-etching steps, for example. It is to be noted that the openings are formed corresponding to all the anchor portions of the beam structures 2, 3 and the fixed electrodes 10, 11, 12.

Figure 6:
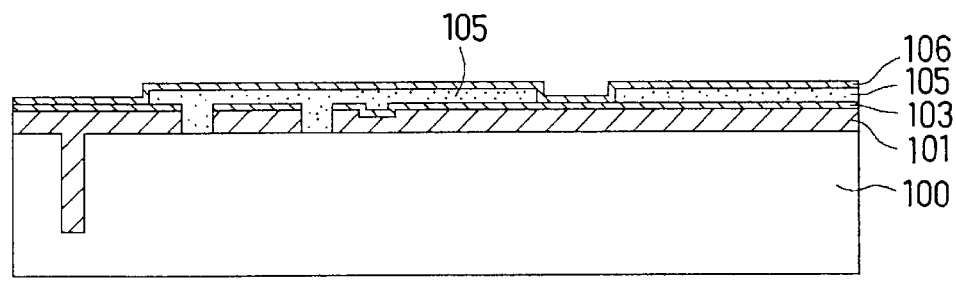

Subsequently, as shown in FIG. 6, a polycrystalline silicon thin film 105 is formed as a material forming the anchor portions in the openings 104 and on the silicon nitride film 103 by a film thickness of 0.5 $\mu$m to 2 $\mu$m. During film formation or thereafter, an impurity is introduced in the polycrystalline silicon thin film 105 to turn it into a conductive thin film. Further, the polycrystalline silicon thin film 105 is patterned through photolithography and etching steps, and the impurity-doped polycrystalline silicon thin film 105 is thereby formed in a predetermined region on the openings 104 and the silicon nitride film 103. After that, a nitride film 106 is formed on the polycrystalline silicon thin film 105.

In the photolithography step for the polycrystalline silicon thin film 105, because the polycrystalline silicon thin film 105 is thin (0.5 $\mu$m–2 $\mu$m), the shape of the openings 104 formed in the silicon nitride film 103 can be seen through the polycrystalline silicon thin film 105, and photo-mask alignment can be accurately carried out.

Figure 7:
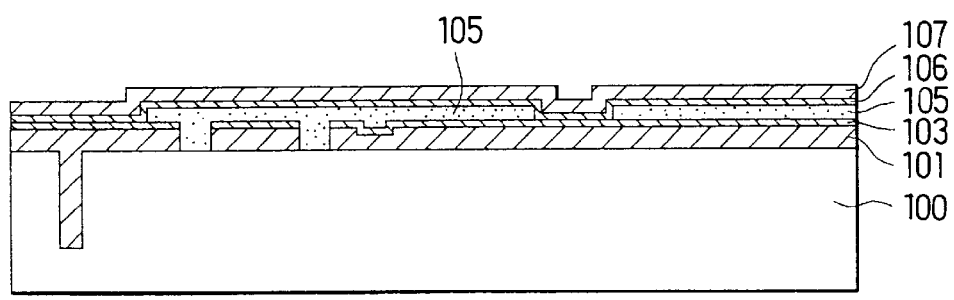
Figure 8:
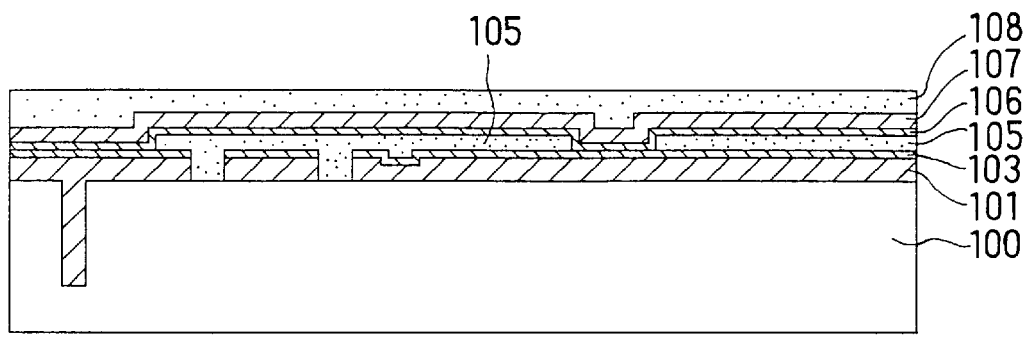

Next, as shown in FIG. 7, a silicon oxide film (second insulating thin film) 107 is formed on the nitride film 106. Following this, as shown in FIG. 8, a polycrystalline silicon thin film 108 serving as a thin film for lamination is formed on the silicon oxide film 107, and the surface thereof is flattened by mechanical polishing or the like.

Figure 9:
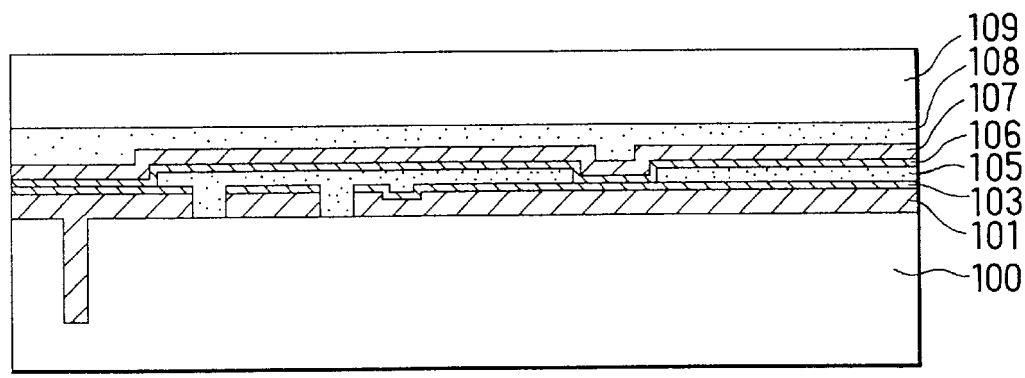
Figure 10:
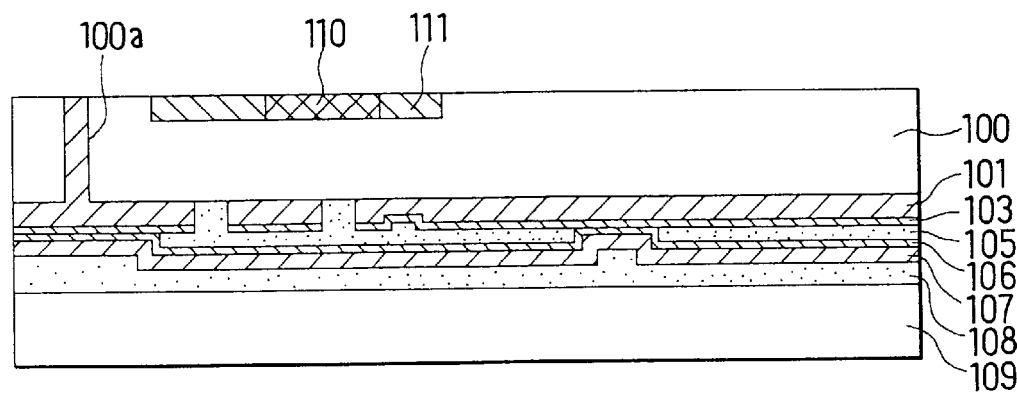

Next, as shown in FIG. 9, a monocrystalline silicon substrate (second semiconductor substrate) 109 which is different from the silicon substrate 100 is prepared and laminated onto the polycrystalline silicon thin film 108. After that, as shown in FIG. 10, the structure is then flipped 180° so that the substrate 100 becomes the upper surface, and the silicon substrate 100 is thinned by mechanical polishing or the like. At that time, when polishing is carried out to a depth of the trench 10a formed in the silicon substrate 100, i.e., until the edge of the trench 10a is exposed, the silicon oxide film 101 appears on the surface of the silicon substrate 100. As a result, since the hardness of the polished surface of the substrate 100 changes, an end point of polishing can be easily detected. Further, with the silicon oxide film 101 formed in the trench 10a used as an alignment mark, film formation and trench etching are carried out in the following steps.

After polishing, a strain gauge 110 to monitor the forced vibration of the beam structure and a wiring layer 111 are formed in the silicon substrate 100. In this case, the strain gauge 110 is formed as a diffusion layer by implanting boron ions with small doses (approximately $3\times10^{14}$cm$^{-3}$) into the N-type monocrystalline silicon substrate 100. The wiring layer 111 is also formed as a diffusion layer by implanting boron ions with large doses (approximately $1\times10^{16}$cm$^{-3}$) into the silicon substrate 100.

Figure 11:
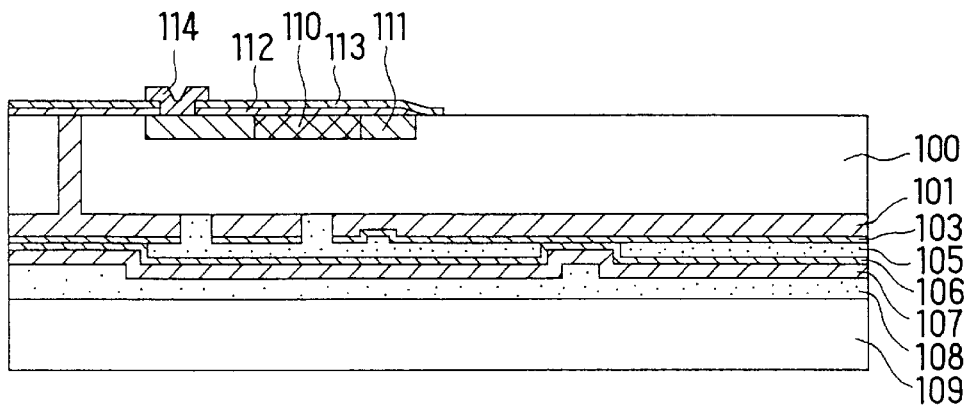

After that, as shown in FIG. 11, an interlayer insulating film 112 and a silicon nitride film 113 are formed on the silicon substrate 100. A contact hole is formed in the insulating film 112 and the silicon nitride film 113 by photolithography and dry etching steps, for example. An aluminum electrode 114 is formed through a film forming step, a photolithography step and an etching step. Although not shown in the figure, phosphorus ions are implanted into the silicon substrate 100 at a location where a constant potential is applied to the substrate 100 and an electrode is formed on that location.

Figure 12:
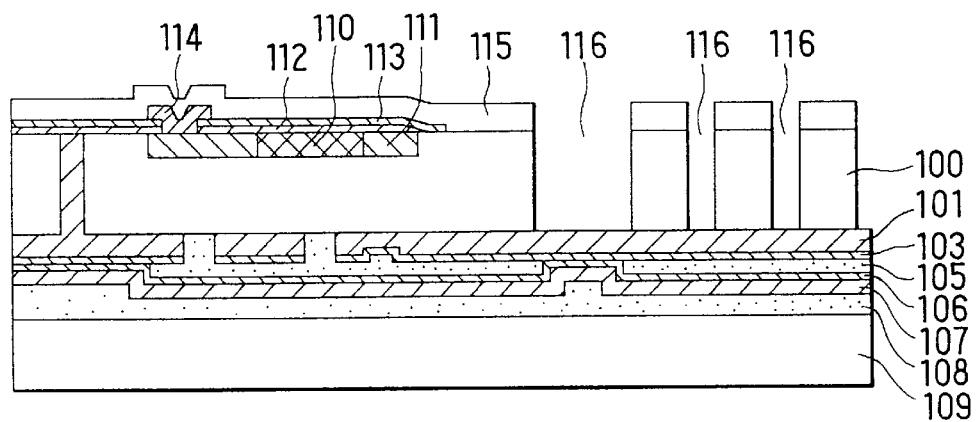

After that, as shown in FIG. 12, a beam structure is formed through photolithography and etching steps using a mask 115 corresponding to a shape of the beam structure. That is, grooves 116 defining both the beam structure and the fixed electrodes are formed in the silicon substrate 100 by trench etching. At this time, etching can be carried out with a soft mask, such as a photo resist, or a hard mask, such as an oxide film.

Figure 13:
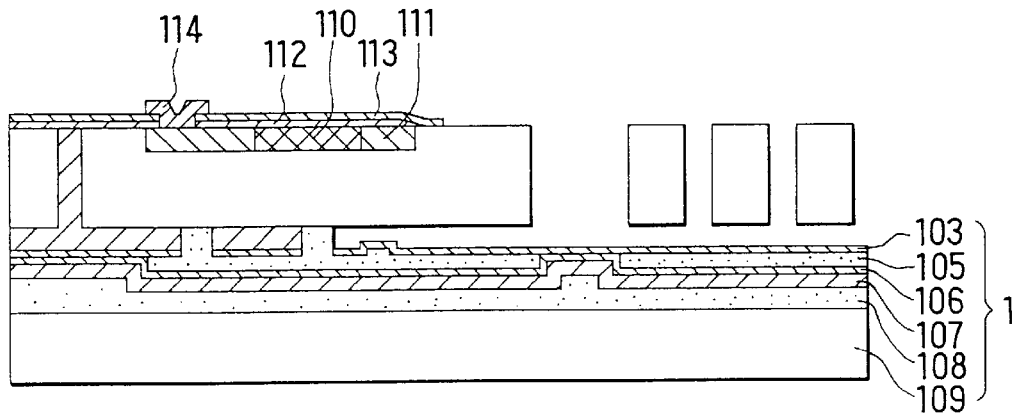

Finally, as shown in FIG. 13, the silicon oxide film 101 is removed by etching with, for example an HF etchant, whereby the silicon substrate 100 is turned into a movable beam structure. At this time, a sublimation agent such as paradiclolbenzene is utilized to prevent the movable beam structure from sticking on the substrate in a drying step after etching.

Through the steps described above, the semiconductor type yaw rate sensor shown in FIGS. 1, 2 can be manufactured. It is to be noted that a part from the silicon nitride film 103 to the silicon substrate 109 shown in FIG. 13 constitutes the substrate 1 shown in FIG. 1.

(Modifications)

Although the yaw rate sensor of the first embodiment improves a signal to noise (S/N) ratio by carrying out the differential detection of the output signals from the beam structures 2, 3, a yaw rate can be detected with only one beam structure.

In addition, although the weighted portion was supported by four beam portions extending from the respective anchor portions in the first embodiment, just one beam portion may be formed to support the weighted portion. Needless to say, two, three or more than four beam portions may instead be formed to support the weighted portion, according to specific design parameters.

Figure 14:
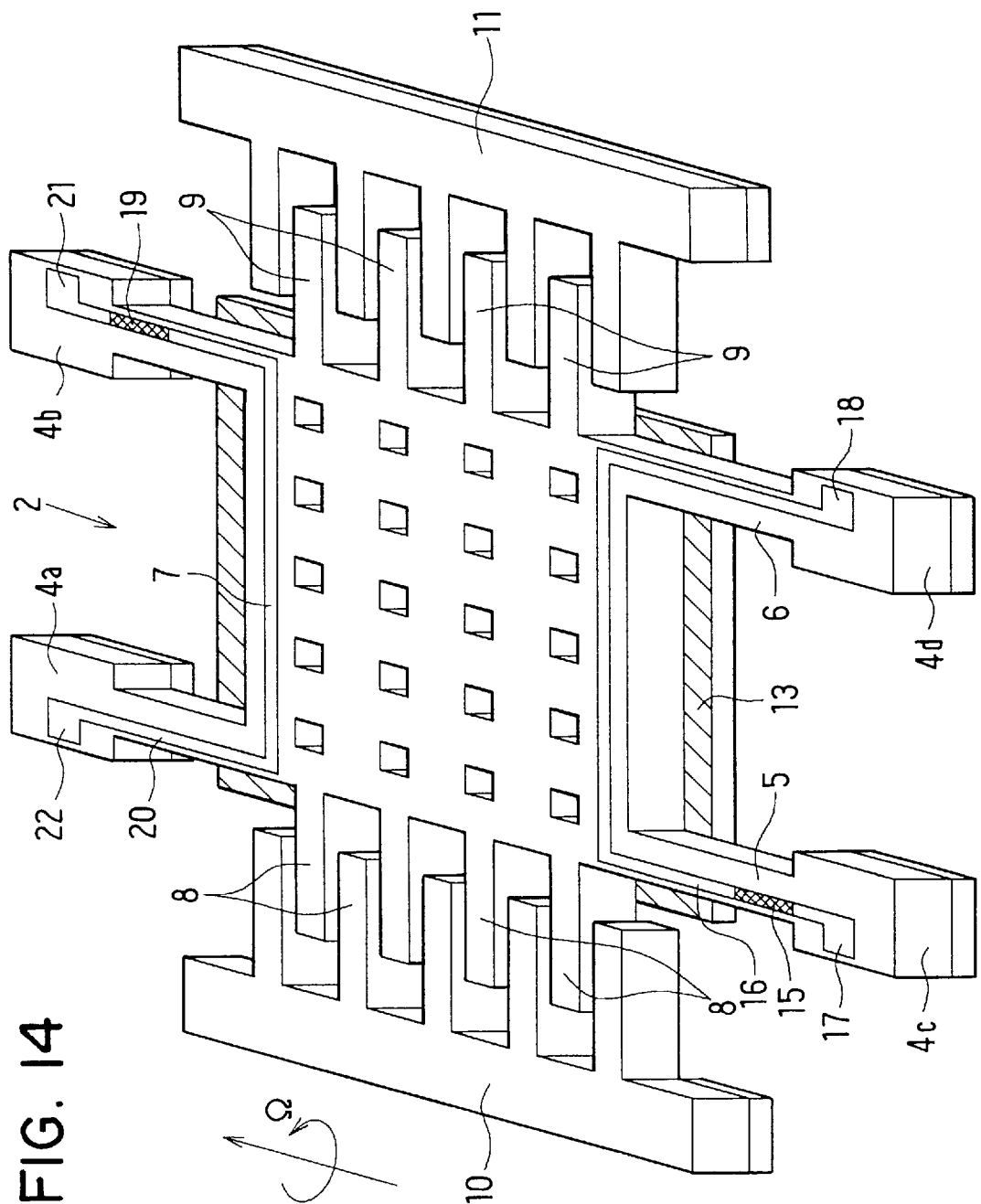
FIG. 14 is a perspective view showing a beam structure and fixed electrodes according to a modification of the first embodiment.

In the first embodiment, for example, the wiring layer 16 was formed in a U-shaped configuration in the beam portion 5, and both ends of the wiring layer 16 were connected to a pair of electrodes 17, 18 formed in the anchor portion 4c. However, as shown in FIG. 14, the wiring layer 16 (20) may be provided in such a manner that one end of the wiring layer 16 (20) is connected to a first electrode 17 (21) formed in one of the anchor portions 4c (4b) and the other end of the wiring layer is connected to a second electrode 18 (22) formed in the other of the anchor portions 4d (4a). That is, the wiring layer 16 (20) extends from one of the anchor portions 4c (4b), along the weighted portion 7 to the other of the anchor portions 6 (5). In this case, even if a width of the beam portion 5, 6 is small, the wiring layers 16, 20 and the strain gauges 15, 19 can be easily formed.

Four strain gauges may be formed in the four beam portions 5, 6 extending from the anchor portions 4a–4d, respectively, and the strain gauges may be connected to form a full-bridge circuit to monitor the forced vibration of the beam structure 2.

Figure 15:
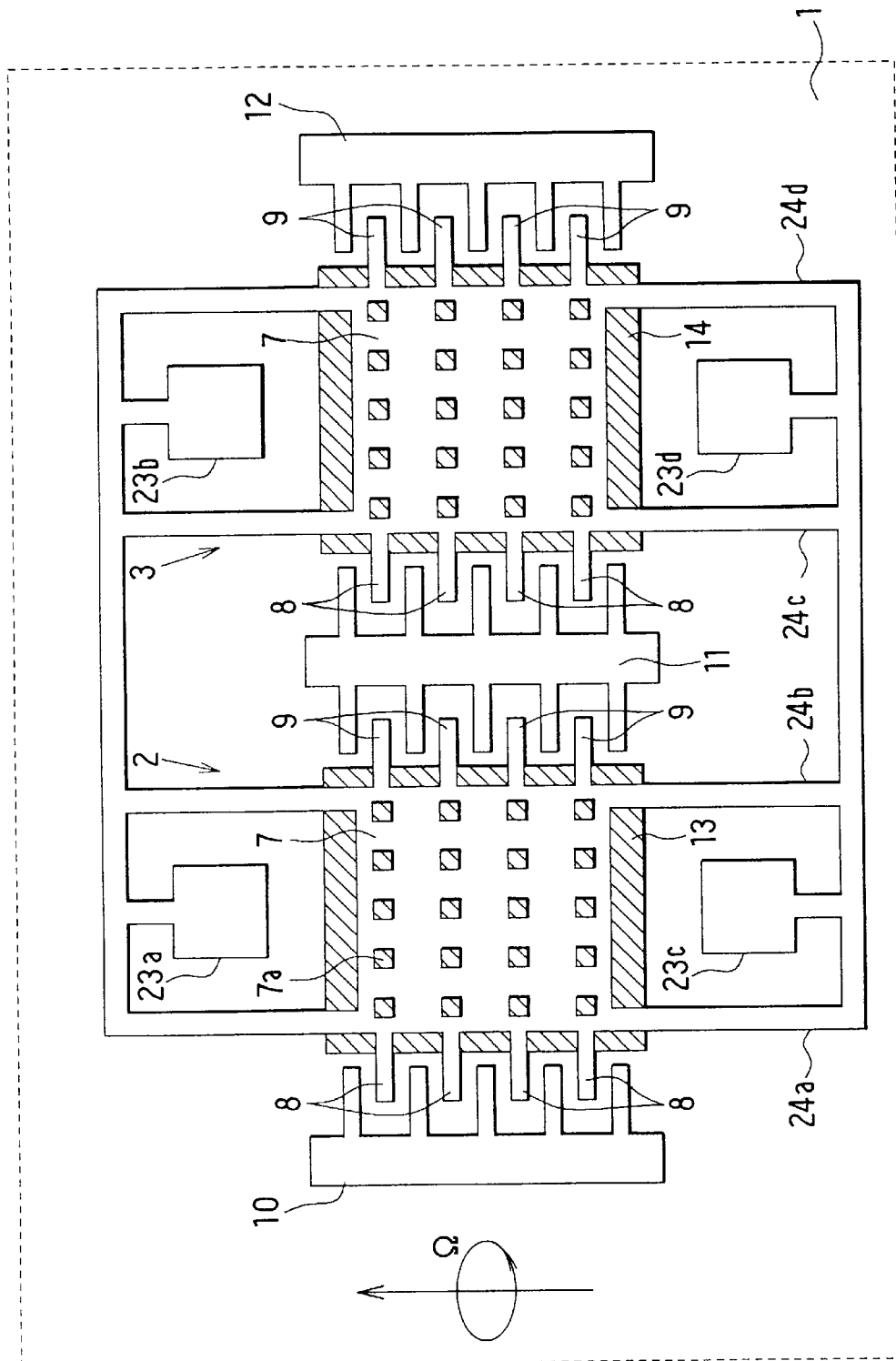
FIG. 15 is a plan view of a semiconductor type yaw rate sensor according to a modification of the first embodiment.
Figure 16:
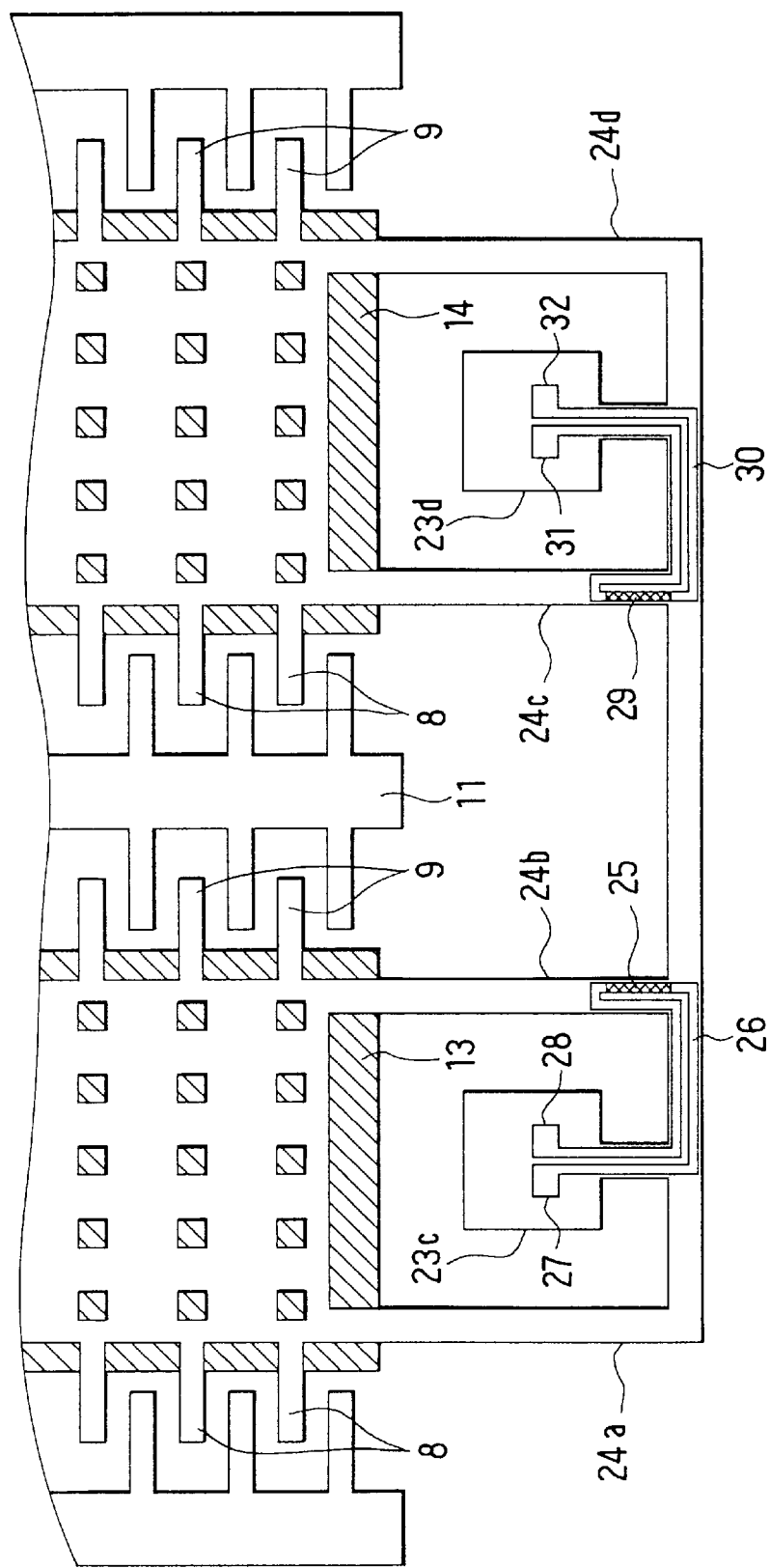
FIG. 16 is a partially enlarged view of the semiconductor type yaw rate sensor shown in FIG. 15.
Figure 17:
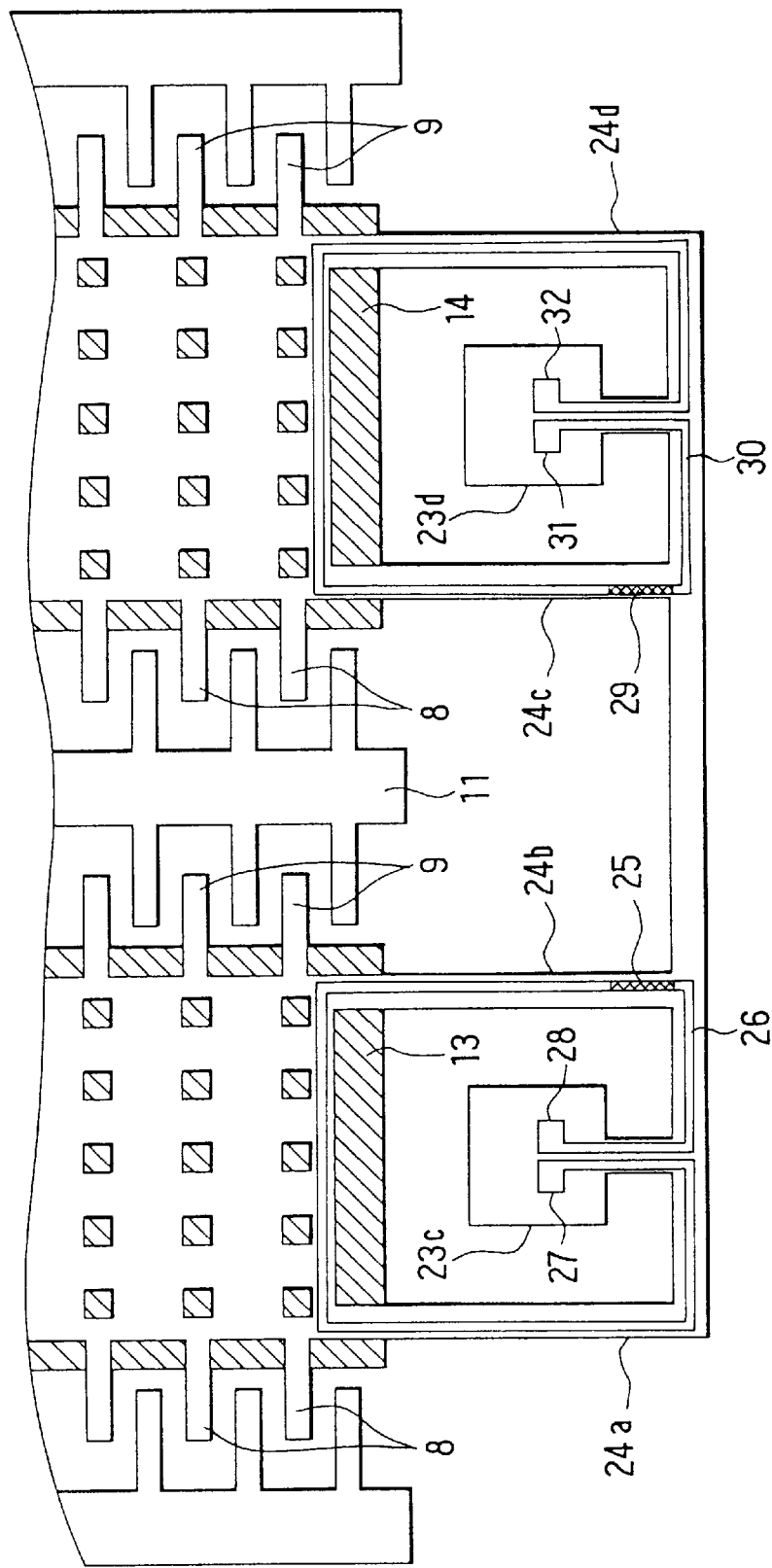
FIG. 17 is a partially enlarged view showing a modification of the semiconductor type yaw rate sensor in FIG. 15.

Further, the present invention can be applied to a semiconductor type yaw rate sensor which vibrates in a manner similar to a tuning fork. In such a semiconductor type yaw rate sensor, as shown in FIG. 15, weighted portions 7 of the beam structures 2, 3 are supported by four anchor portions 23a, 23b, 23c, 23d through beam portions 24a, 24b, 24c, 24d. In this case, as shown in FIG. 16, a strain gauge 25 is formed on the beam portion 24b and is electrically connected to a pair of electrodes 27, 28 formed on the anchor portion 23c via a wiring layer 26. Also, a strain gauge 29 is formed on the beam portion 24c and is electrically connected to a pair of electrodes 31, 32 formed on the anchor portion 23d via a wiring layer 30. Alternatively, as shown in FIG. 17, the strain gauge 25 can be electrically connected to the pair of electrodes 27, 28 with a wiring layer 26 traveling through the beam portions 24a, the weighted portion 7, and the beam portion 24b. In the same way, the strain gauge 29 can be electrically connected to the pair of electrodes 31, 32 with a wiring layer 30 traveling through the beam portions 24c, the weighted portion 7, and the beam portion 24d.

Figure 18:
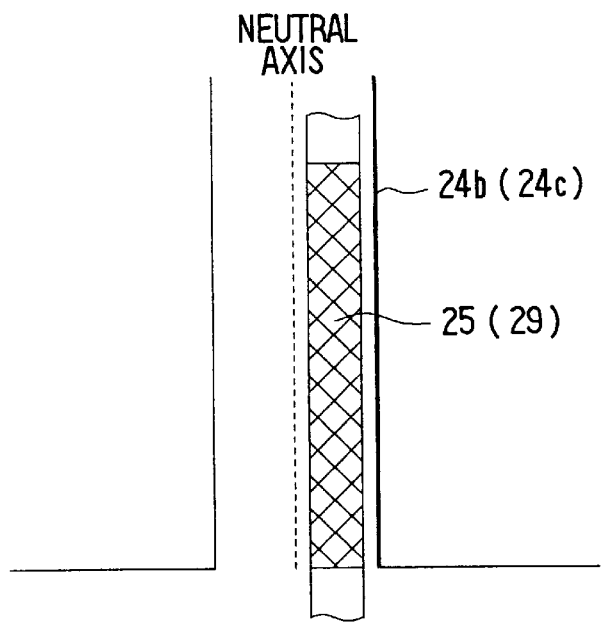
FIG. 18 is a view showing a formation position for a strain gauge.

In the yaw rate sensor shown in FIGS. 16 and 17, the strain gauge 25 (29) is formed at a position which is offset from a neutral axis of the beam portion 24b (24c) as shown in FIG. 18. As a result, an output corresponding to the forced vibration of the beam structure 2 (3) can be generated from the strain gauge 25 (29). Therefore, in the same way as the first embodiment, the forced vibrations of the beam structures 2, 3 can be monitored.

Further, in the yaw rate sensor shown in FIGS. 16 and 17, even when a protective film (passivation film) is formed on diffusion layers (strain gauges 25, 29 and wiring layers 26, 30), it is possible to minimize deformation of the turning fork type beam structure due to protective film stress because the strain gauges 25, 29 are respectively provided on the beam portions 24b, 24c, which are located between the anchor portions 23c, 23d among the four beam portions 24a, 24b, 24c, 24d.

Figure 19:
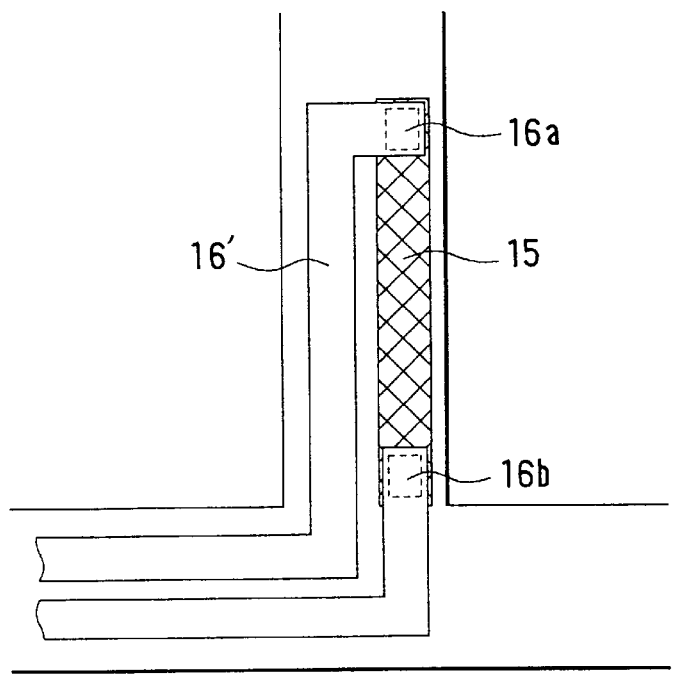
FIG. 19 is a view showing a strain gauge 15 and an aluminum wire 16' in a modification of the first embodiment.

In the embodiments described above, the wiring layers 16, 20, 26, 30 were formed by diffusion layers. However, wiring for the strain gauges 15, 19, 25, 29 can be carried out using a metal wire such as an aluminum wire. For example, in the structure shown in FIG. 2, an aluminum wire 16' may be formed as shown in FIG. 19. In this case, the strain gauge 15 is electrically connected to the aluminum wire 16' via contact holes 16a, 16b formed in, for example, an insulating film disposed thereon.

The present invention is not limited to the yaw rate sensor of an electrostatic capacitance type in which a yaw rate is detected based on capacitance change of capacitors formed between the beam structures 2, 3 and the lower electrodes 13, 14. Rather it can also be applied to a yaw rate sensor of a transistor detection type as disclosed in JP-A-H8-148698.

What is claimed is:

1. A semiconductor type yaw rate sensor comprising:

a substrate;

a beam structure formed from a semiconductor material that has at least one anchor portion disposed on the substrate, a weighted portion located above the substrate at a predetermined distance therefrom, and at least one beam portion which extends from the anchor portion and supports the weighted portion;

a movable electrode formed onto the weighted portion;

a fixed electrode formed on the substrate in such a manner that the fixed electrode faces the movable electrode, wherein, when a drive voltage is applied between the movable electrode and the fixed electrode, the beam structure is forcibly caused to vibrate in a direction that is horizontal relative to a substrate surface plane;

a yaw rate detector that detects a yaw rate based on displacement of the beam structure in a direction that is vertical relative to the substrate surface plane during forced vibration of the beam structure; and at least one strain gauge formed in the beam portion that monitors the forced vibration of the beam structure.

2. A semiconductor type yaw rate sensor according to claim 1, further comprising a circuit that applies a drive voltage for the forced vibration of the beam structure between the movable electrode and the fixed electrode, the drive voltage being generated based on an output of the strain gauge.

3. A semiconductor type yaw rate sensor according to claim 1, further comprising a wire connected to the strain gauge, the wire being made up of a diffusion layer formed in the beam portion.

4. A semiconductor type yaw rate sensor according to claim 1, further comprising a wire connected to the strain gauge, the wire being made up of a metal wire formed on the beam portion.

5. A semiconductor type yaw rate sensor according to claim 3, further comprising an electrode formed in the anchor portion for sending out an output of the strain gauge, wherein the wire is formed between the strain gauge and the electrode.

6. A semiconductor type yaw rate sensor according to claim 4, further comprising an electrode formed in the anchor portion for sending out an output of the strain gauge, wherein the wire is formed between the strain gauge and the electrode.

7. A semiconductor type yaw rate sensor according to claim 5, wherein the wire is formed in a U-shaped configuration in the beam portion and both first and second ends of the wire are connected to a pair of electrodes formed in the anchor portion.

8. A semiconductor type yaw rate sensor according to claim 6, wherein the wire is formed in a U-shaped configuration in the beam portion and both first and second ends of the wire are connected to a pair of electrodes formed in the anchor portion.

9. A semiconductor type yaw rate sensor according to claim 5, wherein at least two anchor portions are disposed on the substrate, and the wire is formed in such a manner that one end of the wire is connected to a first electrode formed in one of the anchor portions, and the other end of the wire is connected to a second electrode formed in the other of the anchor portions.

10. A semiconductor type yaw rate sensor according to claim 6, wherein two anchor portions are disposed on the substrate, and the wire is formed in such a manner that one end of the wire is connected to a first electrode formed in one of the anchor portions and the other end of the wire is connected to a second electrode formed in the other of the anchor portions.

11. A semiconductor type yaw rate sensor according to claim 1, wherein two strain gauges are located in different positions so that, while the beam structure is caused to vibrate in the horizontal direction, when a tensile stress is applied to one of the strain gauges, a compressive stress is applied to the other of the strain gauges.

12. A semiconductor type yaw rate sensor according to claim 1, wherein the strain gauge is located to be offset from a neutral axis of the beam portion during the forced vibration.

* * * * *